(12) United States Patent
Naito (10) Patent No.: US 11,405,553 B2
(45) Date of Patent: Aug. 2, 2022

(54) OPTICAL DEVICE AND ITS CONTROL METHOD

(71) Applicant: CANON KABUSHIKI KAISHA, Tokyo (JP)

(72) Inventor: Go Naito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 11 days.

(21) Appl. No.: 16/917,184

(22) Filed: Jun. 30, 2020

(65) Prior Publication Data
US 2021/0006717 A1 Jan. 7, 2021

(30) Foreign Application Priority Data

Jul. 2, 2019 (JP) .............................. JP2019-123911

(51) Int. Cl.
*H04N 5/232* (2006.01)
*G06T 5/20* (2006.01)
*H04N 5/225* (2006.01)

(52) U.S. Cl.
CPC ........... *H04N 5/23267* (2013.01); *G06T 5/20* (2013.01); *H04N 5/2254* (2013.01); *H04N 5/23258* (2013.01); *H04N 5/23287* (2013.01); *G06T 2207/20201* (2013.01)

(58) Field of Classification Search
CPC ............. H04N 5/23267; H04N 5/2254; H04N 5/23258; H04N 5/23287; G06T 5/20; G06T 2207/20201
See application file for complete search history.

(56) References Cited

U.S. PATENT DOCUMENTS

| | | | |
|---|---|---|---|
| 9,692,976 B2 | 6/2017 | Sakurai et al. | |
| 2016/0261806 A1* | 9/2016 | Honjo | H04N 5/23209 |
| 2019/0199930 A1* | 6/2019 | Noguchi | H04N 5/23264 |
| 2020/0288062 A1* | 9/2020 | Kojima | H04N 5/23209 |

FOREIGN PATENT DOCUMENTS

JP 2015-194711 A 11/2015

* cited by examiner

*Primary Examiner* — Christopher K Peterson
(74) *Attorney, Agent, or Firm* — Cowan, Liebowitz & Latman, P.C.

(57) ABSTRACT

A second optical device that can be mounted on a first optical device provided with an image blur correction unit comprising: at least one processor and memory holding a program which makes the processor function as: a correction unit configured to correct an image blur based on a shake signal output by a detection unit after the detection unit detects shaking of the second optical device; a control unit configured to control the correction unit by calculating signals respectively processed by first and second filters with respect to the shake signal; and a communication unit configured to receive third filter information to be used by an image blur correction unit of the first optical device from the first optical device, wherein a characteristic of the second filter is set based on the third filter information acquired by the communication unit.

17 Claims, 7 Drawing Sheets

OPTICAL DEVICE AND ITS CONTROL METHOD

BACKGROUND OF THE INVENTION

Field of the Invention

The present invention relates to a technique for image blur correction in an optical device.

Description of the Related Art

An image pickup apparatus and an image pickup lens device each having an image blur correction mechanism can reduce the influence of camera shake or the like on an image that is shot during hand-held shooting. Image blur correction methods include, for example, a first method for driving a correction lens that configures an imaging optical system and a second method for driving an image pickup element in a camera body. In an interchangeable-lens image pickup apparatus, the first method is adopted for an interchangeable lens barrel and image blur correction is performed by driving a lens, and the second method is adopted for the camera body and image blur correction is performed by driving (moving or rotating) the image pickup element. Hereinafter, an image blur correction means using the lens according to the first method is referred to as a "lens-side shake correction means", and an image blur correction means driven by the image pickup element according to the second method is referred to a "camera-side shake correction means". In an embodiment in which the two methods are combined, image blur correction can be performed by driving both the correction lens configuring an image pickup optical system and the image pickup element in cooperation.

Japanese Patent Application Laid-Open No. 2015-194711 discloses a control method for performing image blur correction by using the lens-side shake correction means and the camera-side shake correction means. Shake signals acquired by a shake detection unit are separated into a signal component in a high frequency domain and a signal component in a low frequency domain, and the lens-side shake correction means and the camera-side shake correction means respectively perform image blur correction based on the signals corresponding to each frequency domain.

However, in the control as disclosed in Japanese Patent Application Laid-Open No. 2015-194711, it is always necessary to perform high-speed communication between the lens device and the camera body when image blur correction is performed. In contrast, in an embodiment in which the lens-side shake correction means and the camera-side shake correction means perform image blur correction independently of each other, a frequency of detectable shaking may differ depending on a performance difference of a shake detection means provided for controlling each shake correction means. In this case, correction remainder may occur in shake correction depending on frequency components included in the image bluer.

SUMMARY OF THE INVENTION

The present invention is for easily controlling both a lens-side shake correction unit and a camera-side shake correction unit, and suppress deterioration of an image blur correction performance during image blur correction by using the both shake correction units.

An optical device according to the embodiments of the present invention is a second optical device that can be mounted on a first optical device provided with an image blur correction unit comprising: at least one processor and memory holding a program which makes the processor function as: a correction unit configured to correct an image blur based on a shake signal output by a detection unit after the detection unit detects shaking of the second optical device; a control unit configured to control the correction unit by calculating signals respectively processed by first and second filters with respect to the shake signal; and a communication unit configured to receive third filter information to be used by an image blur correction unit of the first optical device from the first optical device, wherein a characteristic of the second filter is set based on the third filter information acquired by the communication unit.

Further features of the present invention will become apparent from the following description of experimental artifacts with reference to the attached drawings.

DESCRIPTION OF THE EMBODIMENTS

First Embodiment

Figure 1A:
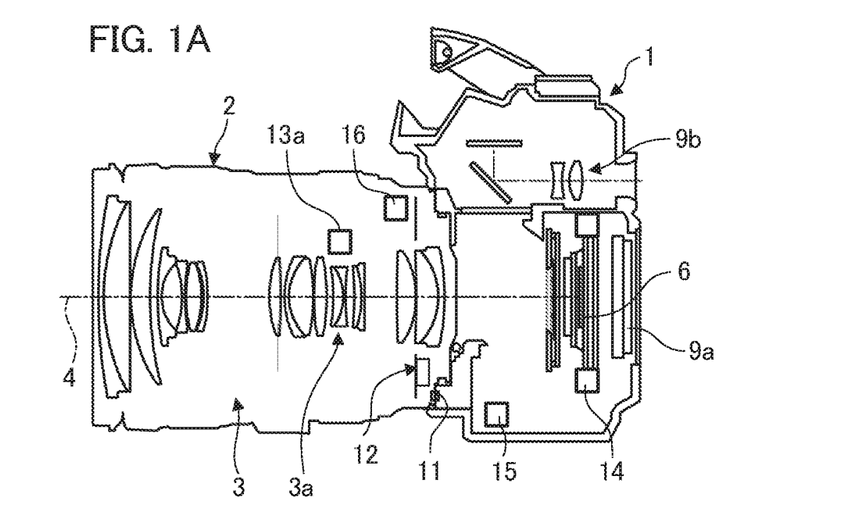
FIGS. 1A and 1B are a central cross-sectional diagram and a block diagram of an imaging system according to the embodiment of the present invention.
Figure 1B:
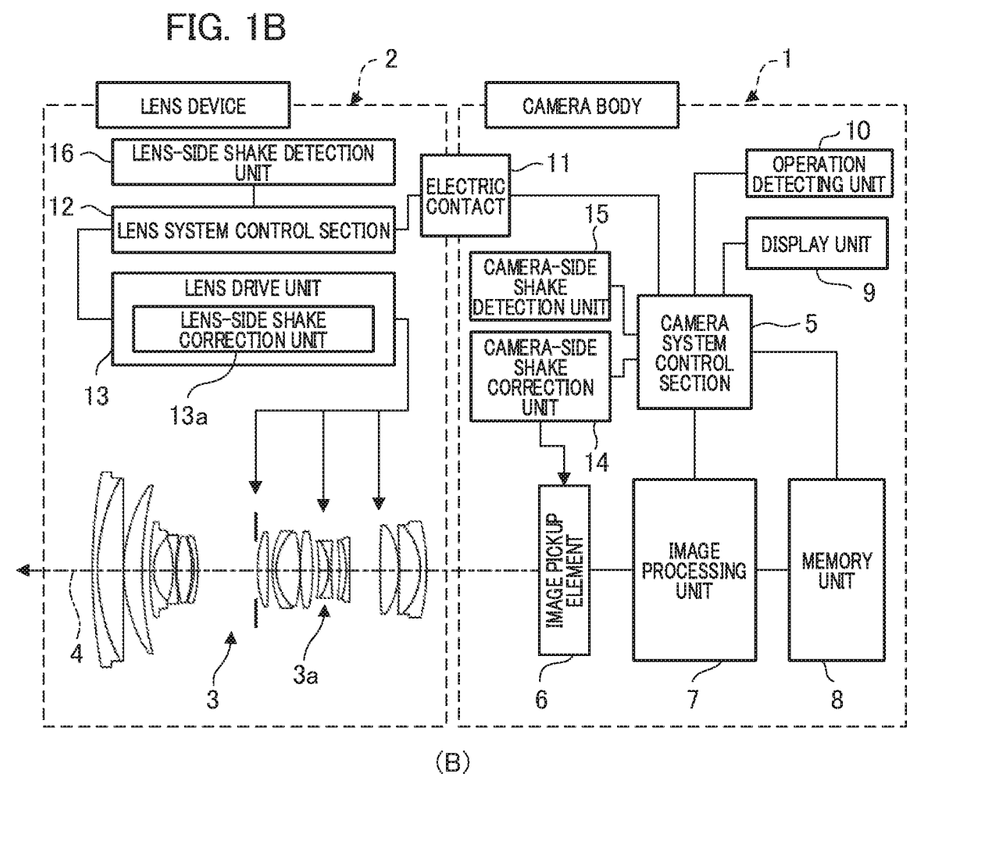

Embodiments of the present invention will now be described in detail with reference to the accompanying drawings. An image pickup apparatus that is as an example of an optical device of the present embodiment will be described with reference to FIG. 1A to FIG. 5. FIG. 1A is a central cross-sectional view of the image pickup apparatus provided with a plurality of image blur correction units and FIG. 1B is a block diagram illustrating an electrical configuration. In the present embodiment, an example of referred to as an "interchangeable-lens image pickup system" in which a lens device 2 can be mounted on a camera body 1 is described. The camera body 1 and the lens device 2 are optical devices that are both provided with an image blur correcting system. However, the present invention can also be applied to an image pickup apparatus having a structure in which a lens barrel cannot be removed because it is fixed to the camera body 1.

The lens device 2 includes an imaging optical system 3 configured by a plurality of lenses and its optical axis 4 is shown in FIGS. 1A and 1B. The imaging optical system 3 includes a shake correction lens 3a, and image blur correction is performed by driving the shake correction lens 3a.

First, the configuration of the camera body 1 will be described. A camera system control section 5 includes a CPU (central processing unit) and is a central unit that controls the entire imaging system. The camera body 1 includes an image pickup element 6 and an image processing unit 7 that processes the output of the image pickup element 6. A signal processed by the image processing unit 7 is stored in a memory unit 8.

A rear display device 9a is provided on the rear surface of the camera body 1 and an EVF (electronic viewfinder) 9b is provided in a finder of the camera body 1. A display unit 9 includes these display devices and is controlled by the camera system control section 5. An operation detecting unit 10 detects signals by an operation switch such as a shutter release button (not illustrated) and by various operating members, and outputs the detected signals to the camera system control section 5.

A camera-side shake correction unit 14 drives the image pickup element 6 in a plane perpendicular to the optical axis 4 in accordance with control signals from the camera system control section 5. A camera-side shake detection unit 15 detects the shaking of the camera body 1 by an angular velocity sensor or the like, and outputs shake detection signals to the camera system control section 5.

The camera system control section 5 can communicate with a lens system control section 12 provided in the lens device 2 through an electric contact 11 that performs communication between the camera body 1 and the lens device 2 in a connected state in which the lens device 2 is mounted on the camera body 1.

The lens system control section 12 has a CPU and controls each configuration unit provided in the lens device 2. A lens drive unit 13 drives a focus lens that performs focus adjustment and the shake correction lens 3a in accordance with the control signals of the lens system control section 12. The lens drive unit 13 includes a lens-side shake correction unit 13a. The lens-side shake correction unit 13a corrects image bluer by driving the shake correction lens 3a on a plane perpendicular to the optical axis 4. A lens-side shake detection unit 16 detects shaking of the lens device 2 by an angular velocity sensor or the like, and outputs the shake detection signals to the lens system control section 12.

In the present embodiment, the camera body 1 and the lens device 2 are each provided with an image bluer correction units. Specifically, the camera-side shake correction unit 14 configures a first image blur correction units and the lens-side shake correction unit 13a configures a second image blur correction units. The camera-side shake detection unit 15 configures a first shake detection means and the lens-side shake detection unit 16 configures a second shake detection means. In the image pickup apparatus, an imaging means includes the imaging optical system 3 and the image pickup element 6, and light from an object forms an image on an imaging plane of the image pickup element 6 through the imaging optical system 3. Since an evaluation amount for focus state detection and a photometric amount are acquired based on the output of the image pickup element 6, the focus adjustment of the image pickup optical system 3 and the exposure control of the image pickup element 6 can be performed.

The image processing unit 7 acquires imaging signals and performs image processing. The image processing unit 7 has, for example, an A/D converter, a white balance adjustment circuit, a gamma correction circuit, and an interpolation calculation circuit, and can generate image data for recording. The image processing unit 7 is provided with a color interpolation processing unit, and performs color interpolation (demosaicing) processing based on signals of a Bayer arrangement to generate a color image. The image processing unit 7 compresses data such as an image, a moving image, and sound by using a predetermined method.

Furthermore, the image processing unit 7 detects a motion vector by comparing a plurality of images acquired from the image pickup element 6. In this case, the shake detection signals based on the motion vector can be generated, and thereby the camera-side shake detection means can be configured by the image pickup element 6 and the image processing unit 7.

Recording and reproduction are performed by using the memory unit 8 and the display unit 9 (the rear display device 9a and the EVF 9b). Recording video image signals are stored in the memory unit 8 by the camera system control section 5, and the display unit 9 displays an image on a screen after shooting and presents it to a user as necessary.

The imaging system is controlled by using the camera system control section 5, the operation detecting unit 10, and the lens system control section 12. The camera system control section 5 generates, for example, timing signals at the time for imaging and outputs them to each unit, and controls an imaging system, an image processing system, and a recording and reproducing system in response to operation signals. For example, when the operation detecting unit 10 detects the depressing of the shutter release button, the camera system control section 5 controls, for example, the driving of the image pickup element 6, the operation of the image processing unit 7, and the compression processing, and controls the information display by the display unit 9. If the rear display device 9a includes a touch panel, the camera system control section 5 executes various processes in accordance with operations on the display screen.

In the control for the imaging optical system, for example, the camera system control section 5 calculates an appropriate focus position and an appropriate diaphragm position based on the signals from the image pickup element 6, and transmits a command to the lens system control section 12 via the electric contact 11. The lens system control section 12 controls the driving of the focus lens and the diaphragm in accordance with the command.

When an image blur correction mode is set in the image pickup apparatus, the camera system control section 5 controls the camera-side shake correction unit 14 based on detection signals of the camera-side shake detection unit 15. The lens system control section 12 controls the lens-side shake correction unit 13a based on detection signals of the lens-side shake detection unit 16. Specifically, the camera-side shake detection unit 15, the camera-side shake correction unit 14, the lens-side shake detection unit 16, and the lens-side shake correction unit 13a are used for controlling image blur correction. For example, the camera-side shake detection unit 15 and the lens-side shake detection unit 16 are provided with a gyro sensor to enable detecting the rotation of the image pickup apparatus with respect to the optical axis 4. The camera-side shake correction unit 14 is provided with a mechanism for driving (moving, rotating) the image pickup element 6 on a plane perpendicular to the optical axis 4. The lens-side shake correction unit 13a has a mechanism for driving the shake correction lens 3a on a plane perpendicular to the optical axis 4.

Specifically, the camera system control section 5 and the lens system control section 12 respectively acquire shake signals (detection signals) detected by the camera-side shake detection unit 15 and the lens-side shake detection unit 16, and calculate driving amounts of the image pickup element 6 and the shake correction lens 3a. The calculated driving amounts are transmitted to the camera-side shake correction unit 14 and the lens-side shake correction unit 13a as a command value, and the driving of the image pickup element 6 and the shake correction lens 3a is controlled. Note that although the lens system control section 12 and the lens drive unit 13 can drive the focus lens and the diaphragm and the like in addition to the shake correction lens 3a, they are not directly related to the essence of the present invention, and their descriptions will be omitted.

As described above, the camera system control section 5 and the lens system control section 12 control the operations of each unit of the camera body 1 and the lens device 2 in accordance with user's operations so that still images and moving images can be shot.

Figure 2A:
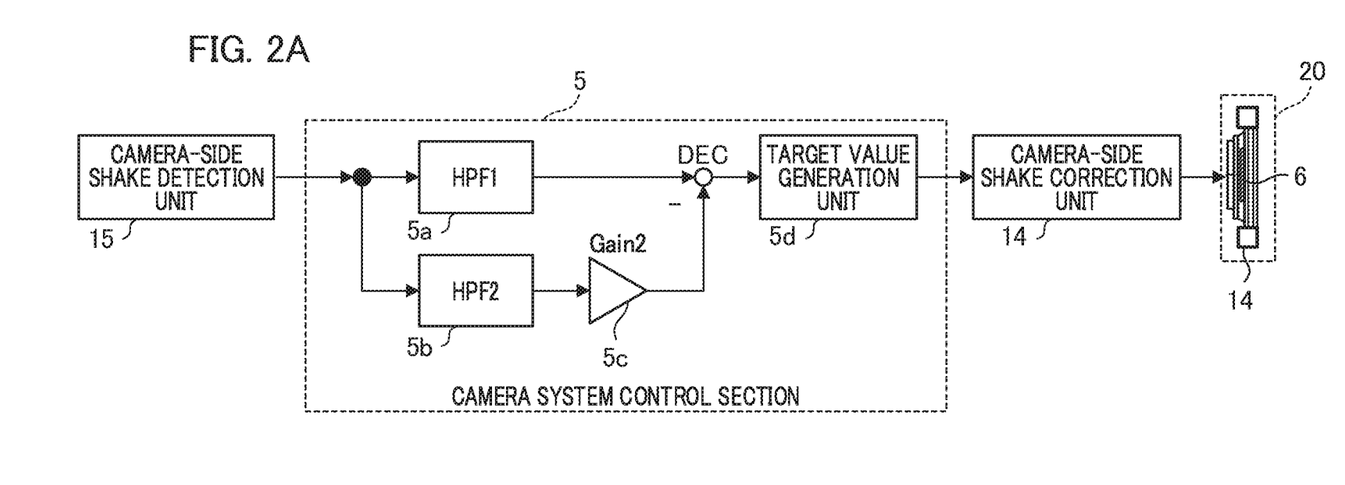
FIGS. 2A and 2B are block diagrams illustrating each control unit of the first embodiment.
Figure 2B:
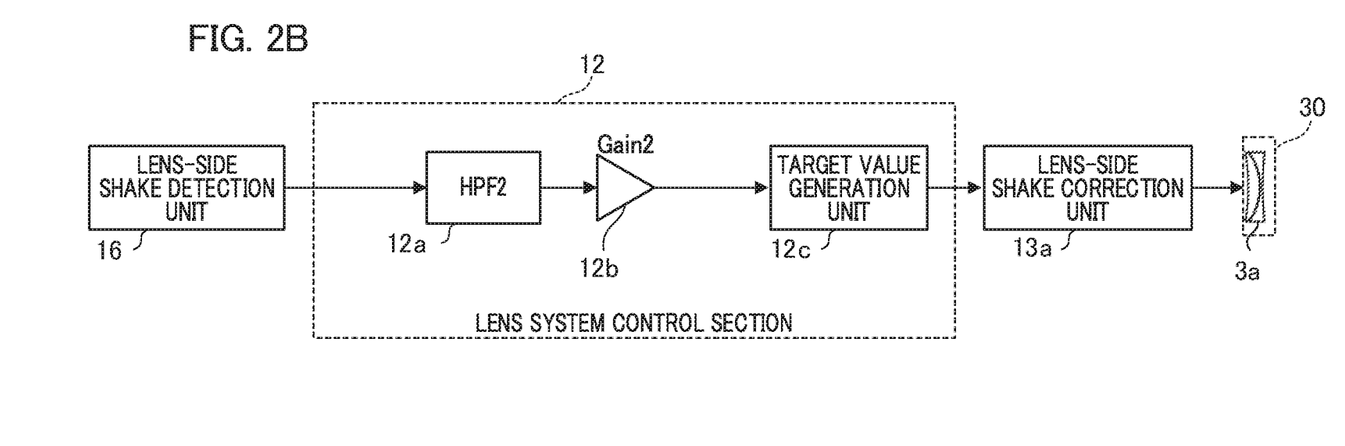

Next, the process performed by the camera system control section 5 and the lens system control section 12 will be described in detail with reference to FIGS. 2A and 2B. FIG. 2A is a control block diagram of the camera-side shake correction system provided in the camera main body 1 and illustrates the camera-side shake detection unit 15, the camera system control section 5, the camera-side shake correction unit 14, and an image pickup element unit 20 for image blur correction. FIG. 2B is a control block diagram of the lens-side shake correction system provided in the lens device 2 and illustrates the lens-side shake detection unit 16, the lens system control section 12, the lens-side shake correction unit 13a, and a lens unit 30 for image blur correction. Since the configurations of the image pickup element unit 20 and the lens unit 30 for image blur correction are publicly known, their descriptions will be omitted.

In FIG. 2A, the camera system control section 5 includes a plurality of high-pass filters (hereinafter, also referred to as "HPF") 5a and 5b. The first high-pass filter 5a and the second high-pass filter 5b respectively perform filtering processing on the output of the camera-side shake detection unit 15. The characteristic of the first high-pass filter 5a is determined corresponding to the characteristic of the camera-side shake detection unit 15. The characteristic of the second high-pass filter 5b is determined in correspondence with the characteristic of the lens-side shake detection unit 16, and the time constant of the second high-pass filter 5b is different from that of the first high-pass filter 5a. A camera-side gain compensator 5c performs gain processing on the output of the second high-pass filter 5b, where a predetermined gain value is multiplied. The output of the first high-pass filter 5a and the output of the gain compensator 5c are input to a subtraction unit DEC. The subtraction unit DEC calculates a difference between the output of the first HPF 5a and the output of the gain compensator 5c and outputs the difference to a target value generation unit 5d. The target value generation unit 5d generates a driving target value based on the output of the subtraction unit DEC and transmits it to the camera-side shake correction unit 14.

In FIG. 2B, the lens system control section 12 includes a second high-pass filter 12a that processes the output of the lens-side shake detection unit 16. A lens-side gain compensator 12b performs gain processing on the output of the second high-pass filter 12a. Based on the output of the gain compensator 12b, a target value generation unit 12c generates a drive target value and transmits it to the lens-side shake correction unit 13a.

In FIGS. 2A and 2B, the HPF 5b and the HPF 12a, which are the second high-pass filters, represent block elements that perform the same process, and are configured by high-pass filters having the same time constant. Similarly, the camera-side gain compensator 5c and the lens-side gain compensator 12b represent block elements that perform the same process and are configured by gain compensators having the same amplification factor. The camera-side shake correction system and the lens-side shake correction system shown in FIGS. 2A and 2B respectively have shake detection units, the signal processing performed by each system have a relation, and image blur correction is controlled by using the image pickup element unit 20 and the lens unit 30 (cooperative drive control).

Figure 3A:
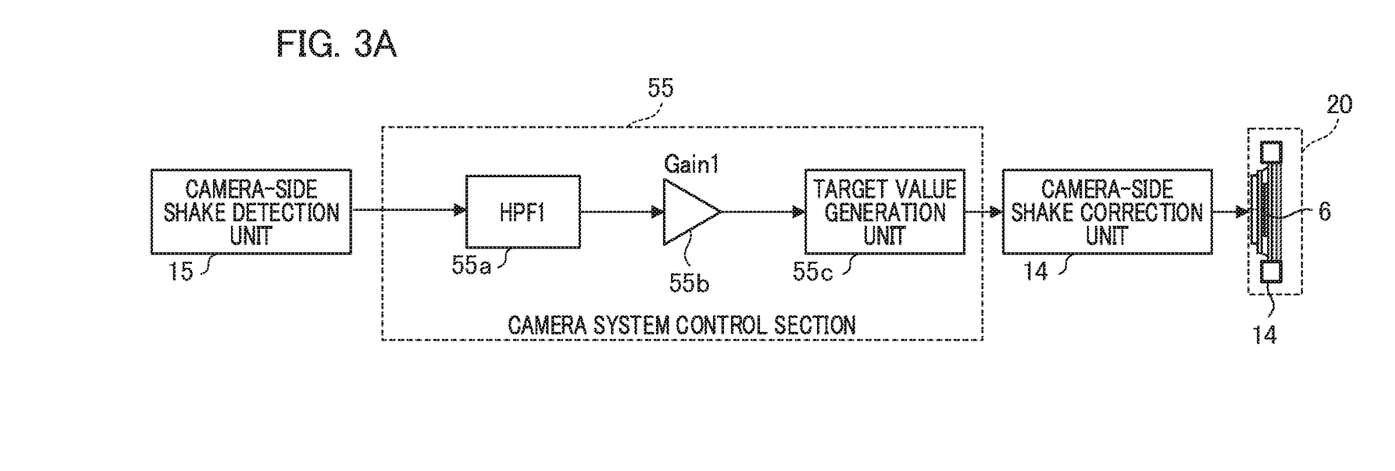
FIGS. 3A and 3B are block diagrams illustrating a case in which shake correction is controlled on the camera-side and the lens-side independently.
Figure 3B:
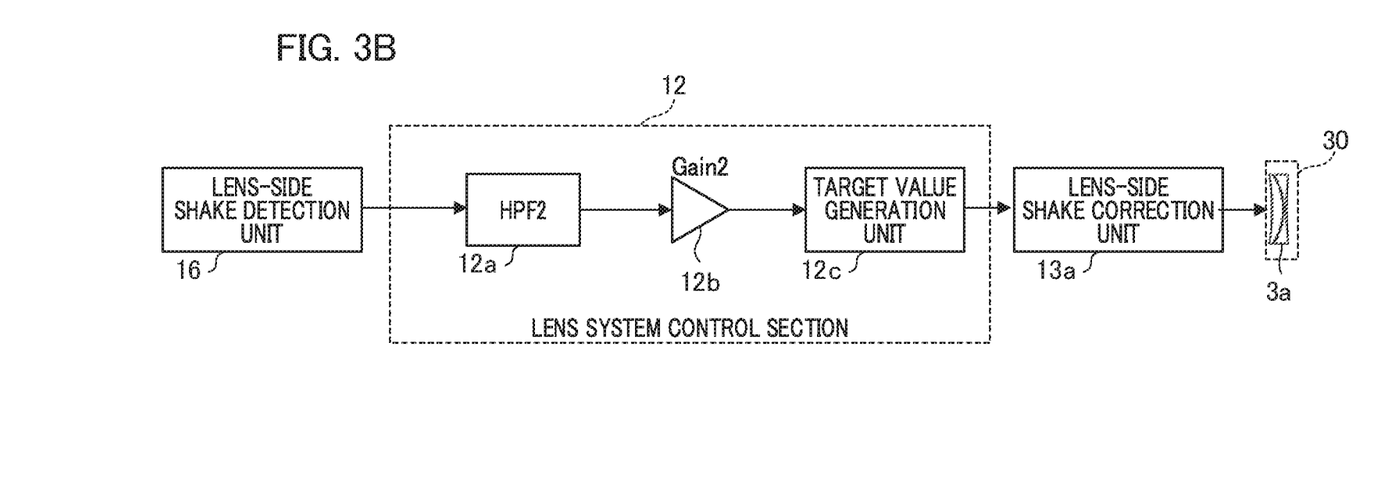

In contrast, the camera-side shake correction system and the lens-side shake correction system be controlled independently of each other. FIGS. 3A and 3B are block diagrams illustrating an example in which the camera-side shake correction system and the lens-side shake correction system are independently controlled. This differs from FIG. 2 with respect to the configuration of a camera system control section 55 in the camera-side shake correction system.

In FIG. 3A, the camera system control section 55 includes a first high-pass filter 55a that performs processes on the output of the camera-side shake detection unit 15. A camera-side gain compensator 55b performs gain processing on the output of the first high-pass filter 55a, and a predetermined gain value is multiplied. A target value generation unit 55c generates a driving target value based on the output of the camera-side gain compensator 55b, and transmits it to the camera-side shake correction unit 14. Since the lens-side shake correction system shown in FIG. 3B has a configuration that is the same as that of FIG. 2B, a detailed description thereof will be omitted.

A control method in the configuration shown in FIGS. 3A and 3B will be described. The camera system control section 55 performs filtering processing on the output of the camera-side shake detection unit 15 using the first high-pass filter 55a. The signals that have passed through the HPF 55a are processed by the camera-side gain compensator 55b at an appropriate gain, and the target value generating unit 55c outputs the drive target value to the camera-side shake correction unit 14. The image pickup element 6 is suitably driven by the camera-side shake correction unit 14 and the image blur correction is performed.

In contrast, the lens system control section 12 performs filtering processing on the output of the lens-side shake detection unit 16 using the second high-pass filter 12a. The signals that have passed through the HPF 12a are processed by the lens-side gain compensator 12b at an appropriate gain, and the target value generation unit 12c outputs a drive target value to the lens-side shake correcting unit 13a. The shake correction lens 3a is suitably driven by the lens-side shake correction unit 13a and the image blur correction is performed.

Since, in the camera-side shake detection unit 15 and the lens-side shake detection unit 16, the outputs based on image bluer (camera-shake) signals that have been input to the camera body 1 and the lens device 2 are generated, basically the same signals are generated. It is assumed here that the image blur correction is performed by driving both the image pickup element 6 and the shake correction lens 3a. The image blur correction can be appropriately performed by driving the image pickup element 6 and the shake correction lens 3a by a certain ratio with respect to the camera shake signals that have been input. The camera-side gain compensator 55b and the lens-side gain compensator 12b are provided for sharing driving amounts by a certain ratio such that the sum of the driving amounts of both the image pickup element 6 and the shake correction lens 3a becomes driving amounts for performing a desired image blur correction. For example, when the camera-side is responsible for 40% of the image blur correction amount and the lens-side is responsible for 60% of the image blur correction amount, the gain value is set such that the ratio of sharing between the camera-side gain compensator 55b and the lens-side gain compensator 12b is 2:3.

In the control with the configuration shown in FIGS. 3A and 3B, if the performance of the camera-side shake detection unit 15 and the performance of the lens-side shake detection unit 16 are the same, image blur correction can be performed without any problems. However, if the performance of the camera-side shake detection unit 15 is different from that of the lens-side shake detection unit 16, there is a concern that appropriate image blur correction cannot be performed. This is due to the difference in the camera-shake signals input to each unit or the difference in the time constant that is set in the high-pass filter provided in the back side of each shake detection unit.

For example, it is assumed that the camera-side shake detection unit 15 is an angular velocity sensor (gyro sensor) having higher sensitivity covering a lower frequency domain than the lens-side shake detection unit 16. In this case, a filter used for the first high-pass filter 55a typically has a larger time constant (low cutoff frequency) compared to the second high-pass filter 12a. Hence, there is a difference in the signal level between the signals output from the HPF 55a and the signals output from the HPF 12a in the low frequency domain. Specifically, in the low frequency domain, signals including more shaking in the low frequency domain (camera-shake component) are detected in the camera-side shake correction system than that of the lens-side shake correction system. In other words, although shake signals (detection signals) in a predetermined low frequency domain can be acquired in the camera-side shake correction system, shake signals in a predetermined low frequency domain cannot be acquired in the lens-side shake correction system. Hence, since image blur correction cannot be performed in the lens-side shake correction system on camera shake in the low frequency domain, the image blur correction is performed in a state in which the driving amounts are reduced depending on the magnitude of the gain of the camera-side gain compensator 55b processed by the camera-side shake correction system. Specifically, in the shake correction system shown in FIGS. 3A and 3B, correction remainder occurs with respect to the camera shake in the low frequency domain.

As described above, if the shake correction systems on the camera-side and the lens-side described in FIGS. 3A and 3B perform image blur correction independently of each other, there is a concern that the correction remainder of image bluer may occur due to the difference in performance of the shake detection units (characteristic difference) or a difference in the time constant of the high-pass filters that is set.

Accordingly, in the present embodiment, the configuration described with reference to FIGS. 2A and 2B is adopted. Even if there is a difference in performance between the camera-side shake detection unit 15 and the lens-side shake detection unit 16, it is possible to suppress the deterioration of the image blur correction performance more than the configurations of FIGS. 3A and 3B. A specific description will be given with reference to FIG. 4.

Figure 4:
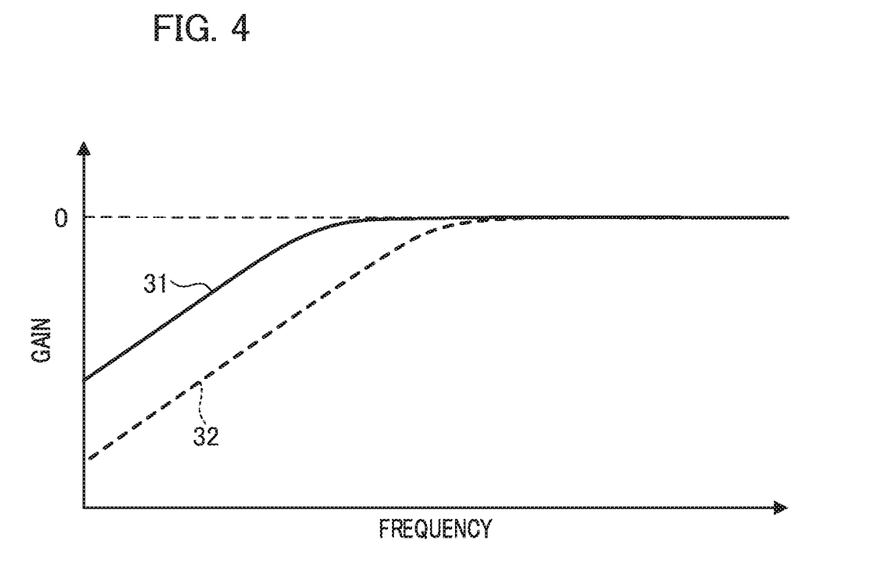
FIG. 4 illustrates a response of frequency of each filter of the first embodiment.

FIG. 4 illustrates the frequency characteristic of the high-pass filter of the present embodiment. In FIG. 4, a frequency is plotted on the horizontal axis and a gain is plotted on the vertical axis to schematically represent the change in the gain with respect to the frequency. Graph lines 31 and 32 in FIG. 4 respectively represent the characteristic of the high-pass filter, and the solid graph line 31 represents a filter having a larger time constant (low cutoff frequency) than the dotted graph line 32. Specifically, the graph line 31 represents the characteristic of the first high-pass filter 5a shown in FIG. 2A, and the graph line 32 represents the characteristic of the second high-pass filters 5b and 12a shown in FIGS. 2A and 2B.

In FIG. 4, compared to the characteristic of the second high-pass filter (refer to the graph line 32), the characteristic of the first high-pass filter (refer to the graph line 31) is that a gain increases at a portion where the frequency is low. This indicates that the cutoff frequency of the first high-pass filter is lower than that of the second high-pass filter. Accordingly, it indicates that more signal components in the low frequency domain of the signals that have passed through the HPF 5a pass than that of the signals that have passed through the HPFs 5b and 12a. Specifically, in the configuration shown in FIGS. 3A and 3B, more signal components in the low frequency domain of the signals from the camera-side shake detection unit 15 that have passed through the HPF 55a pass through without attenuation in comparison to that of the signals from the lens-side shake detection unit 16 that have passed through the HPF 12a.

Typically, a high-performance angular velocity sensor has less noise in signals in the low frequency domain, and the quality of the signals after passing through the HPF having a low cutoff frequency is high. In the use of the high-performance angular velocity sensor for expanding the dynamic range of the detection frequency such that the camera shake signal component in the low frequency domain can also be detected, the cut-off frequency of the HPF in the back side is set low. In contrast, in the angular velocity sensor in which much noise is contained in the signals in the low frequency domain, the quality of the signals in the low frequency domain is low. Hence, the angular velocity sensor is used in combination with an HPF having a high cutoff frequency.

As described above, the characteristic of the high-pass filter being provided often differs depending on the characteristic of the angular velocity sensor to be used. In the configurations shown FIGS. 3A and 3B, a characteristic difference may appear between the first high-pass filter 55a and the second high-pass filter 12a. In the case where there is a difference in the characteristic of the HPF as shown in FIG. 4, a low frequency domain in which the detection becomes impossible in the lens-side shake correction system of FIG. 3B due to attenuation may exist even if the detection is possible in the camera-side shake correction system of FIG. 3A. Accordingly, if the camera-side shake correction system and the lens-side shake correction system perform image blur correction in cooperation by using only the shake detection signals acquired from each of the shake detection units, correction remainder occurs when the camera shake or the like cannot be completely corrected in the low frequency domain.

In contrast, in the system having the configuration shown in FIGS. 2A and 2B, correction remainder can be reduced even if there is a difference in performance between a plurality of shake detection units (angular velocity sensor) to be used and there is a difference in characteristics of the provided HPF.

As shown in FIG. 2A, paths that pass through the first high-pass filter 5a and the second high-pass filter 5b are provided for the signals acquired from the camera-side shake detection unit 15. In this case, the characteristic of the second high-pass filter 5b is equal to that the second high-pass filter 12a provided on the lens-side. The signals that have passed through the second high-pass filter 5b pass through the camera-side gain compensator 5c having a characteristic that is the same as the lens-side gain compensator 12b. The subtraction unit DEC calculates a difference between the signals that have passed through the first high-pass filter 5a and the signals that have passed through the camera-side gain compensator 5c, and outputs the difference to the target value generation unit 5d. Thus, the process by the first HPF 5a and the process by the second HPF 5b, and the camera-side gain compensator 5c are performed on the shake detection signals acquired by the camera-side shake detection unit 15. Subsequently, the difference calculation between these processed signals is performed. Specifically, the process is performed on the camera-side by a signal processing unit having the characteristic that is the same as the signal processing unit provided in the lens-side shake correction system, and a difference between the output of the HPF 5a and the output of the signal processing unit is calculated. This makes enables the camera body-side to detect signal components in the low frequency domain that are attenuated due to the signal processing unit provided in the lens-side shake correction system.

Accordingly, the camera-side shake correction system can detect shake detection signals in the low frequency domain where, in the lens-side shake correction system, image blur correction has not been performed due to the attenuation of the signal component, and can perform image blur correction. According to the present embodiment, correction remainder can be reduced even if there is a difference in the performance between the shake detection units (angular velocity sensors) to be used and there is a difference in characteristic between the provided HPFs.

Figure 5:
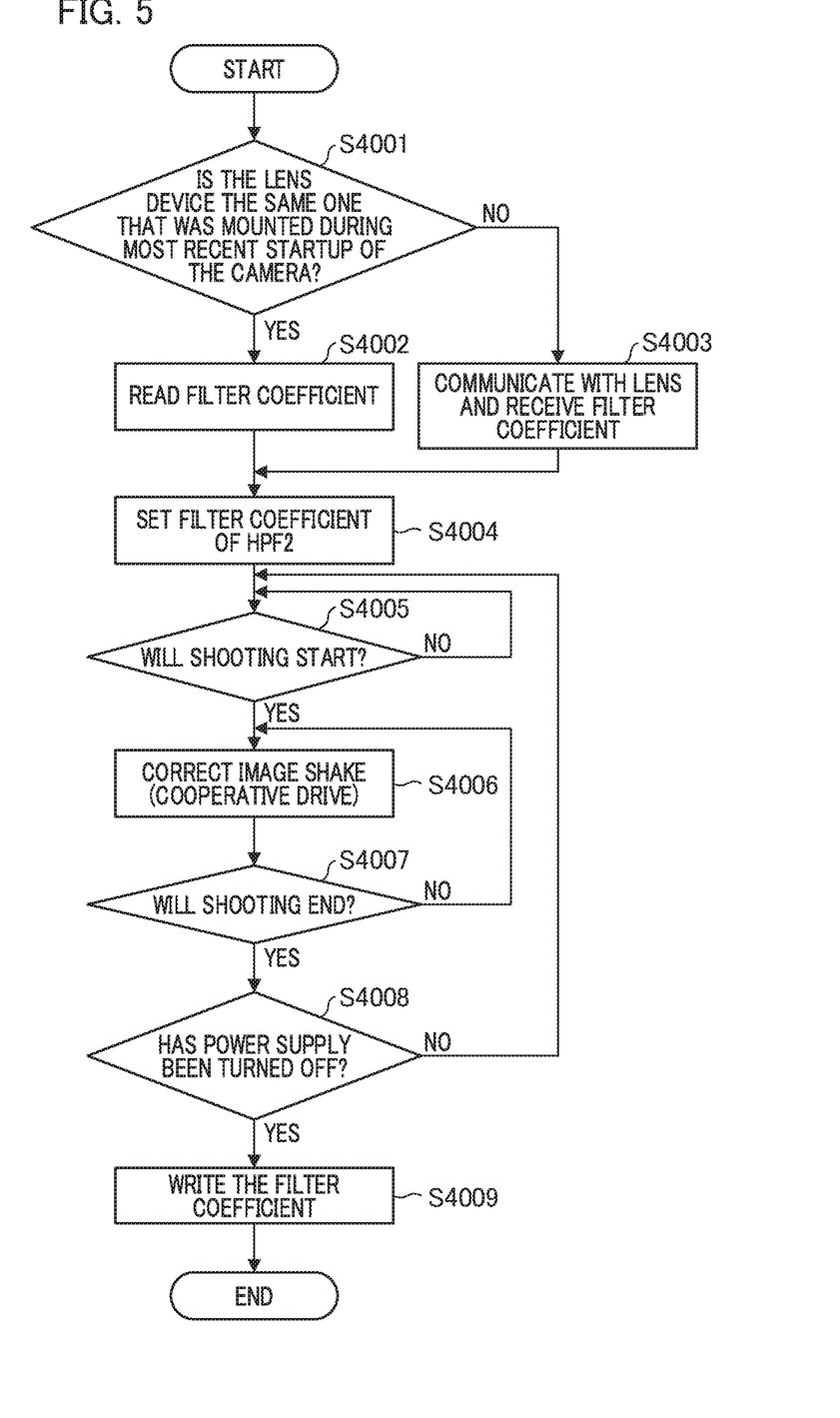
FIG. 5 is a flowchart illustrating a process according to the first embodiment.

The image blur correction process according to the present embodiment will be described with reference to FIG. 5. FIG. 5 is a flowchart that illustrates the image blur correction process in the system having the configuration shown in FIGS. 2A and 2B. Hereinafter, the process that communicates the filter information related to the shake correction system in the lens device 2 to the camera body 1 by lens communication and determines the filter information related to the camera-side shake correction system will be described. The process starts each time the camera body 1 is turned on.

In a state in which the lens device 2 and the camera body 1 are connected after the camera body 1 is turned on, in step S4001, the camera system control section 5 communicates with the lens system control section 12 and determines whether or not the lens device 2 has been mounted during most recent startup of the camera body 1. If it is determined that the lens device 2 that is the same one during the most recent startup of the camera body 1 has been mounted on the camera body, the process proceeds to step S4002. If the lens device 2 that is the same one during the most recent startup of the camera body 1 has not been mounted on the camera body 1, the process proceeds to step S4003.

In step S4002, the camera system control section 5 reads out the filter information stored in the memory unit 8 or the like. The filter information to be read out is, for example, the filter coefficient, the cutoff frequency, the time constant of the second high-pass filter 5b, and the gain value of the camera-side gain compensator 5c. After step S4002, the process proceeds to step S4004.

In step S4003, the camera system control section 5 communicates with the lens device 2, and receives the filter information from the lens system control section 12. The filter information is information about the signal processing unit provided in the lens device 2, and is information related to the characteristics of the second high-pass filter 12a and the lens-side gain compensator 12b. The information is, for example, the filter coefficient, the cutoff frequency, the time constant of the second high-pass filter 12a, and the gain value of the lens-side gain compensator 12b. After the camera system control section 5 receives the filter information, the process proceeds to step S4004.

In step S4004, the camera system control section 5 sets the second high-pass filter 5b and the camera-side gain compensator 5c by using the filter information read in step S4002 or the filter information received in step S4003. After coefficient and the like are set, the process proceeds to step S4005.

In step S4005, the camera system control section 5 determines whether or not to shooting has started. Specifically, determination processing is performed as to whether or not an instruction for starting shooting has been provided from an operation member such as a shutter release button (not illustrated). If it is determined that the instruction for starting shooting has been provided, the process proceeds to step S4006, and if it is determined that the instruction for starting shooting has not been provided, the determination processing in step S4005 is repeatedly executed with a waiting time.

In step S4006, the camera system control section 5 and the lens system control section 12 control the driving of the camera-side shake correction unit 14 and the lens-side shake correction unit 13a in cooperation to execute the image blur correction processing. Then, the process proceeds to step 4007.

In step 4007, the camera system control section 5 determines whether or not shooting has ended. Specifically, the determination processing is performed as to whether or not an instruction for ending shooting has been instructed from the operation member such as a shutter release button (not illustrated). If it is determined that the instruction for ending shooting has been provided, the process proceeds to step S4008, and if it is determined that the instruction for ending shooting has not been provided, the process returns to step S4006.

In step 4008, the camera system control section 5 determines whether or not the power supply has been turned off. Specifically, the determination processing is performed as to whether or not an instruction for turning off the power supply of the camera body has been provided from an operation member such as a power button not illustrated). If the operation to turn off the power supply has been detected, the process proceeds to step S4009, and if the power supply is being turned on, the process returns to step S4005.

In step 4009, after the camera system control section 5 writes the filter information in the memory unit 8 or the like, the series of process ends. The filter information stored in the memory unit 8 and the like is, for example, the filter coefficient, the cutoff frequency, the time constant of the second high-pass filter 5b, and the gain value of the camera-side gain compensator 5c, as in the case of readout in step S4002.

Thus, the filter information for each of the camera-side shake correction system and the lens-side shake correction system is transmitted and received by communication between the camera body 1 and the lens device 2, and the camera-side shake correction unit 14 and the lens-side shake correction unit 13a perform image blur correction.

In the example shown in FIG. 5, the communication of filter information between the camera body 1 and the lens device 2 is performed immediately after the startup of the camera body 1. The present invention is not limited to the timing for communication and update of the filter information. There are a variety of timings for updating the filter information, as are shown, for example, in the examples are below.

Timing when the gain value of the camera-side gain compensator 5c or the lens-side gain compensator 12b is changed upon change of a focal length.

Timing when the cutoff frequency of each high-pass filter is changed during panning operation or the like.

Upon the change of an imaging condition in the image pickup apparatus, the communication of the filter information may be performed in accordance with the operation for changing the imaging condition, and the filter information may be updated at that timing. These matters are the same in the following embodiments.

In the present embodiment, it is possible to reduce correction remainder even if there is a difference in performance between the shake detection units (angular velocity sensors) to be used and there is a difference in characteristic between the provided HPFs. In the case of performing image blur correction by using the shake correction units on the lens-side and the camera-side, both shake correction units can be easily controlled and the deterioration of the image blur correction performance can be suppressed.

In the present embodiment, although the example in which the camera-side shake detection unit 15 has a higher signal quality in the low frequency domain than the lens-side shake detection unit 16 has been described, the case in which the lens-side shake detection unit 16 has a higher signal quality in the low frequency domain may be possible. When the lens-side shake detection unit 16 has a higher signal quality in the low frequency domain than the camera-side shake detection unit 15, the lens system control section 12 performs signal processing by using the first and second high-pass filters, and controls image blur correction based on the difference between both. In this case, the lens system control section 12 has a configuration that is the same as the configuration shown in the camera system control section 5 in FIG. 2A, and controls the driving of the lens unit 30 for image blur correction. The camera system control section 5 has a configuration that is the same as the lens system control section 12 shown in FIG. 2B, and controls the driving of the image pickup element unit 20 for image blur correction. Accordingly, it is possible to obtain the effect the same as the present embodiment. Specifically, with respect to the camera body or the lens device, when the one has a configuration that is the same as the control unit in FIG. 2B is a first optical device and the other one has a configuration that is the same as the control unit in FIG. 2A is a second optical device, either the camera body 1 or the lens device may function as the second optical device. Additionally, the quality of the signals in the low frequency domain between the camera-side shake detection unit 15 and the lens-side shake detection unit 16 is compared, and in relation to this quality, the drive control method may be switched between them when the camera-side shake detection unit 15 has a higher quality and when the lens-side shake detection unit 16 has a higher quality. Specifically, as the result for the comparison, if the signal quality in the low frequency domain of the camera-side shake detection unit 15 is higher, the control shown in FIG. 2A is performed. In this case, the camera system control section 5 controls the driving of the image pickup element unit 20 based on the signals processed by the first filter and the signals processed by the second filter. In contrast, if the signal quality in the low frequency domain of the lens-side shake detection unit 16 is higher, the camera system control section 5 has a configuration that is the same as the configuration shown in the lens system control section 12 in FIG. 2B, and controls the driving of the image pickup element unit 20 for image blur correction. The comparison of signal quality in the low frequency domain can be performed, for example, based on the cutoff frequencies of the HPF 5a and the HPF 12a. Typically, the characteristic of the HPF 5a is determined by taking into consideration the signal quality in the low frequency domain of the camera-side shake detection unit 15, and the characteristic of the HPF 12a is determined by taking into consideration the signal quality in the low frequency domain of the lens-side shake detection unit 16. It can be inferred that as the cutoff frequency of the HPF being lower means that the quality of the signals in the low frequency domain of the shake detection unit (15, 16) is higher. This is the same in the following embodiments.

Second Embodiment

Next, the second embodiment of the present invention will be described with reference to FIG. 6A to FIG. 7. In the present embodiment, the control configuration in the camera system control unit of the first embodiment differs while the other configurations are the same as the first embodiment. Hence, the difference with the first embodiment will be described, and the duplication of the explanation will be avoided by using the reference numerals and symbols already used.

Figure 6A:
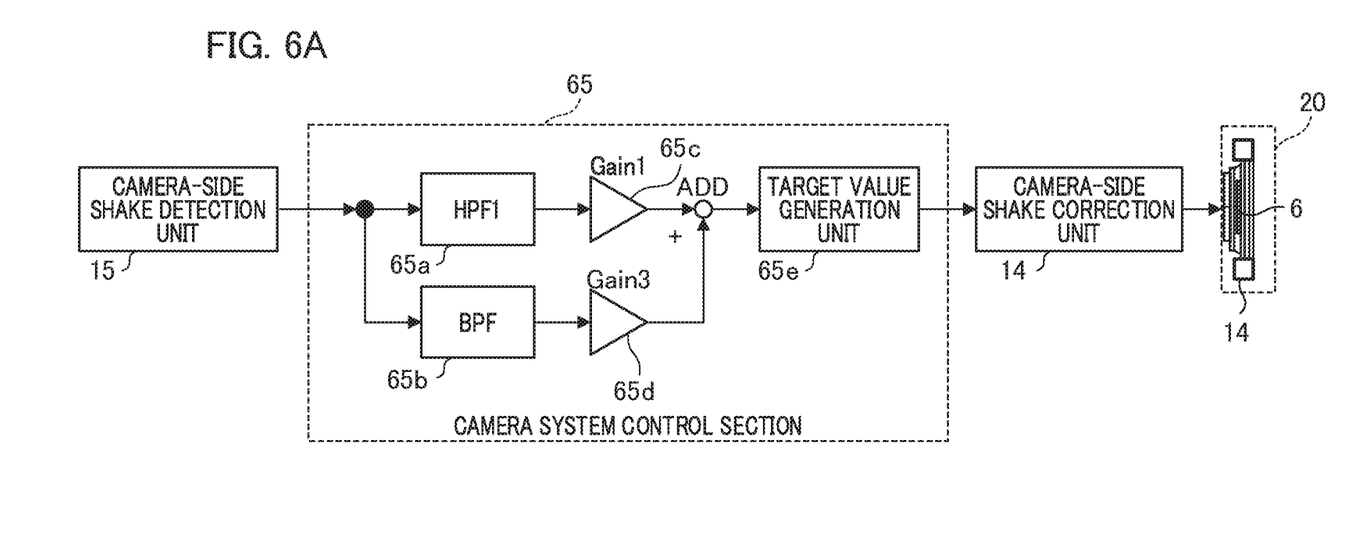
FIGS. 6A and 6B are block diagrams illustrating each control unit of the second embodiment.
Figure 6B:
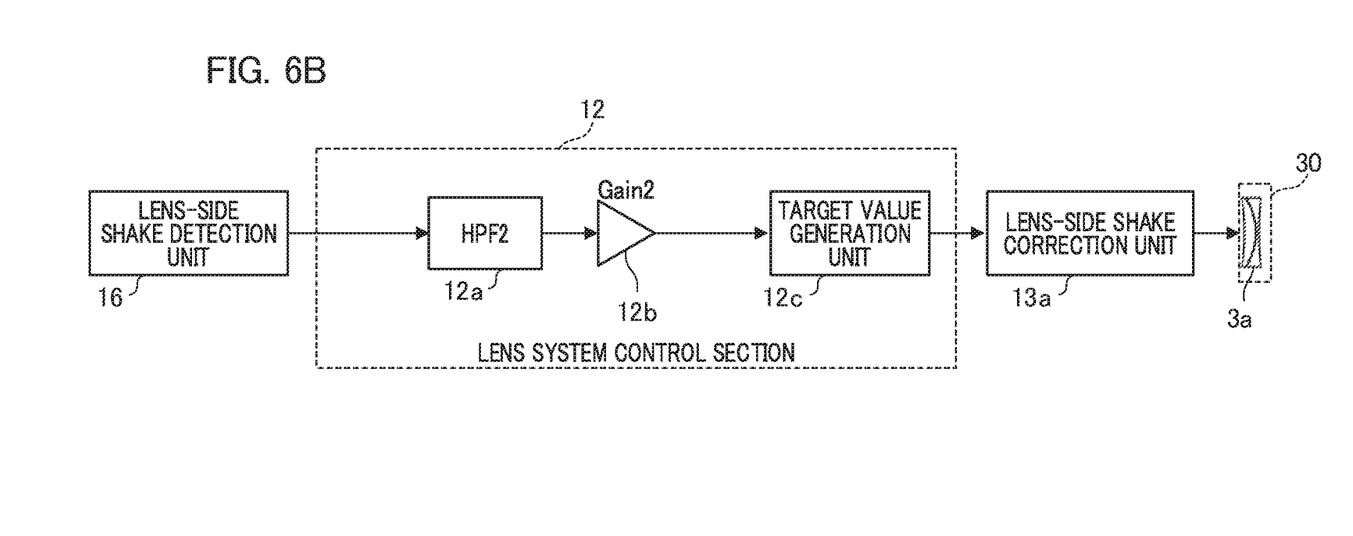
Figure 7:
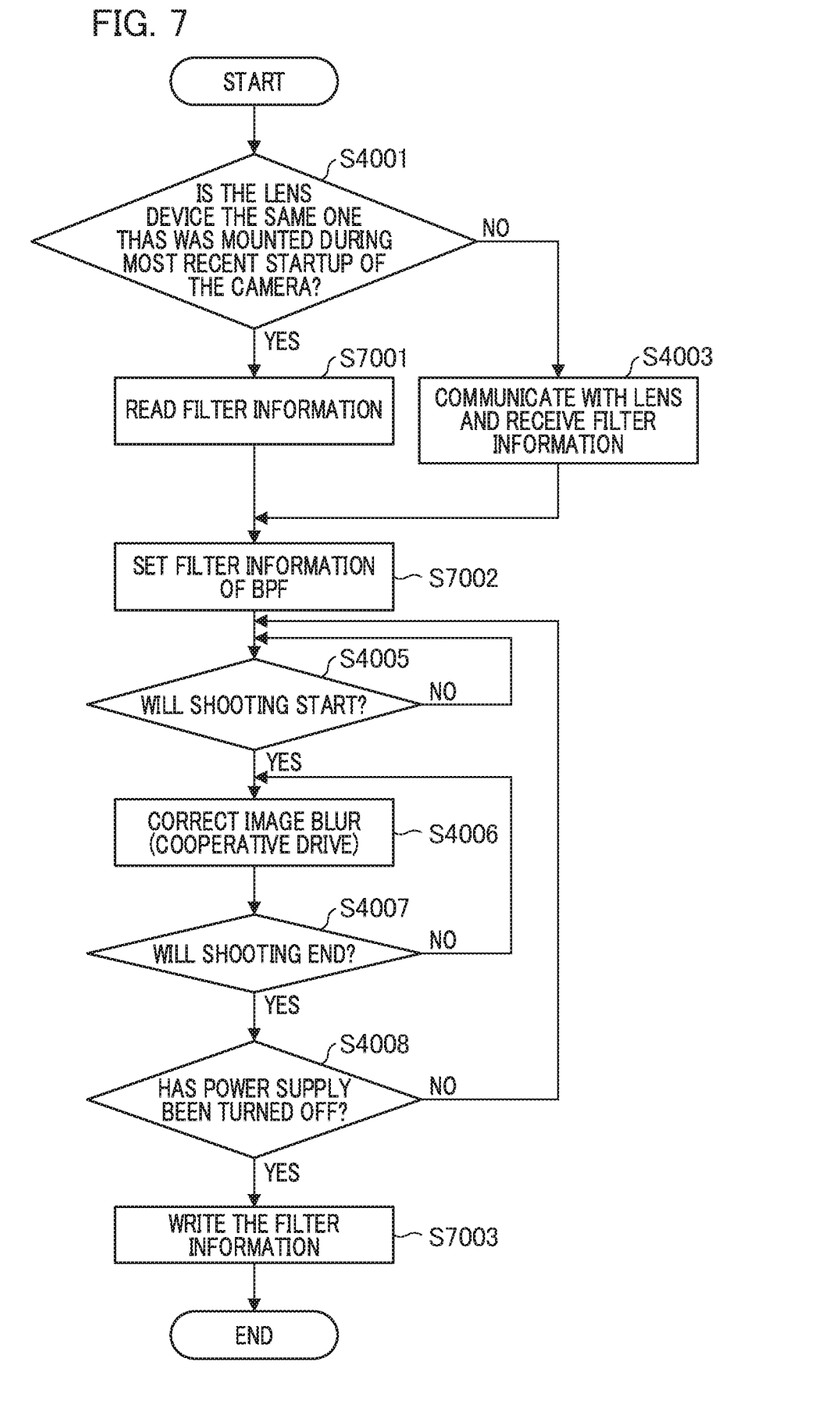
FIG. 7 is a flowchart illustrating a process according to the second embodiment.

FIGS. 6A and 6B illustrate in detail the configuration of the camera system control unit and the lens system control unit in the present embodiment. The difference between the configuration shown in FIG. 6A and the configuration shown in FIG. 2A will mainly be described, and since the configuration shown in FIG. 6B is the same as that of FIG. 2B, the details thereof will be omitted.

In FIG. 6A, a camera system control unit 65 includes a first high-pass filter 65a, a first camera-side gain compensator 65c, a bandpass filter (also referred to as a "BPF") 65b, and a second camera-side gain compensator 65d.

The first high-pass filter 65a performs filtering processing on the output of the camera-side shake detection unit 15. The first camera-side gain compensator 65c performs gain processing on the signals that have passed through the first high-pass filter 65a.

The band bus filter 65a performs filtering processing on the output of the camera-side shake detection unit 15. The characteristic of the bandpass filter 65b is determined by the characteristic of the first high-pass filter 65a and the characteristic of the second high-pass filter 12a in the lens system control section 12. The second camera-side gain compensator 65d performs gain processing on the signals that have passed through the BPF 65b.

An addition unit ADD adds the output of the first camera-side gain compensator 65c and the output of the second camera-side gain compensator 65d, and outputs the signals after addition to a target value generation unit 65e. The target value generation unit 65e generates a driving target value and outputs it to the camera-side shake correction unit 14.

In the present embodiment, the band-pass filter 65b having characteristics determined based on the characteristics of the first high-pass filter 65a and the second high-pass filter 12a is used. Specifically, the signals in a low-frequency band that are attenuated by the second high-pass filter 12a and thus undetectable by the second signal processing section (in the lens system control section 12) can be detected in the first signal processing section (in the camera system control section 65). It is desirable that the bandpass filter 65b has the characteristic that a frequency band between the cut-off frequencies of the first high-pass filter 65a and the second high-pass filter 12a serves as a pass band.

Next, the process in the present embodiment will be described with reference to FIG. 7. Only the differences with the process described with reference to FIG. 5 will be described. When the process proceeds from step S4001 to step S7001, the camera system control section 65 reads out the filter information stored in the memory unit 8 or the like. The filter information to be read out is, for example, the filter coefficient, the cutoff frequency, and the time constant of the second high-pass filter 12a, the filter coefficient and the passband of the band-pass filter 65b. In addition, the information includes the gain values of the lens-side gain compensator 12b, the first camera-side gain compensator 65c, and the second camera-side gain compensator 65d.

After step S7001 or S4003, the process proceeds to step 7002, where the camera system control section 65 sets the filter information of the BPF. The camera system control section 65 sets the band-pass filter 65b based on the filter information read in step S7001 or the filter information of the second high-pass filter 12a received in step S4003. At the same time, the camera system control section 65 sets the second camera-side gain compensator 65d based on the filter information read in step S7001 or the filter information of the second high-pass filter 12a received in step S4003. After step S7002, the process proceeds to step S4005 and the processes from step S4006 to step S4008 are executed.

When the operation to turn off the power supply has been detected in step S4008, the process proceeds to step S7003. In step S7003, the camera system control unit 65 writes the filter information in the memory unit 8 or the like, and the series of processes ends. The filter information stored in the memory unit 8 or the like is, for example, the filter coefficient, the cutoff frequency, the time constant of the second high-pass filter 12a, the filter coefficient and the passband of the band-pass filter 65b. In addition, the information includes the gain values of the lens-side gain compensator 12b, the first camera-side gain compensator 65c, and the second camera-side gain compensator 65d.

According to the present embodiment, image blur correction can be performed by transmitting and receiving the filter information of each shake correction system on the camera-side and the lens-side by the communication between the camera body 1 and the lens device 2, and using the camera-side shake correction unit 14 and the lens-side shake correction unit 13a. Specifically, the image blur correction can be performed by transmitting and receiving the filter information of the shake correction systems of each optical device by the communication between the first optical device and the second optical device to which the first optical device can be mounted, and by using the shake correction units of each optical device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123911, filed Jul. 2, 2019, which is hereby incorporated by reference wherein in its entirety.

What is claimed is:

1. A second optical device that can be mounted on a first optical device provided with an image blur correction unit comprising:
    at least one processor and memory holding a program which makes the processor function as:
    a correction unit configured to correct an image blur based on a shake signal output by a detection after detection unit detects shaking of the second optical device;
    a control unit configured to control the correction unit by calculating signals processed by first filter with respect to the shake signal; and
    a communication unit configured to receive information related to second filter to be used by an image blur correction unit of the first optical device from the first optical device,
    wherein the control unit sets a characteristic of the first filter based on the information acquired by the communication unit.

2. The second optical device according to claim 1, wherein if the first optical device that is connected or a power supply is turned on in the second optical device, the communication unit receives the information.

3. The second optical device according to claim 1, wherein upon a change of an imaging condition, the communication unit receives the information.

4. The second optical device according to claim 1, wherein the control unit controls image blur correction by controlling the correction unit such that the correction unit and the image blur correction unit of the first optical device correct the shaking applied to the second optical device at a predetermined ratio.

5. The second optical device according to claim 1, wherein the control unit sets the characteristics of the first filter so that the characteristics of the first filter and the second filter are the same.

6. The second optical device according to claim 1, wherein the control unit configured to control the correction unit by calculating signals respectively processed by the first filter and third filter with respect to the shake signal.

7. The second optical device according to claim 6, wherein the control unit calculates a difference between a shake signal processed by the third filter and a signal acquired by multiplying a shake signal processed by the first filter by a predetermined gain.

8. The second optical device according to claim 7,
wherein the control unit controls the correction unit by generating a target value for image blur correction based on the difference.

9. The second optical device according to claim 6,
wherein the characteristic of the first filter is set based on the characteristic of the third filter and the characteristic of the second filter included in the information.

10. The second optical device according to claim 9,
wherein the first filter is a band-pass filter through which a signal can be passed in a frequency band between a cutoff frequency of the third filter and a cutoff frequency of the second filter.

11. The second optical device according to claim 6,
wherein the first filter and the third filter are high-pass filters.

12. The second optical device according to claim 11,
wherein the processor further function as:
a comparison unit configured to compare cutoff frequencies between the second filter and the third filter,
wherein the control unit switches a first control that controls the correction unit by calculating the signals that have been processed by the third and second filters with respect to the shake signal, and a second control that controls the correction unit by calculating the signal that has been processed by the third filter with respect to the shake signal based on a comparison result by the comparison unit.

13. The second optical device according to claim 12,
wherein the control unit performs the first control if the comparison result indicates that the third filter is a high-pass filter having a lower cutoff frequency than the second filter. The second optical device according to claim 1, wherein the characteristic of the first filter is set based on the characteristic of the second filter included in the information.

14. The second optical device according to claim 1,
wherein the characteristic of the first filter is set based on the characteristic of the second filter included in the information.

15. The second optical device according to claim 1,
wherein the information includes at least one of a filter coefficient, a cutoff frequency, and a time constant of the second filter.

16. The second optical device according to claim 1,
wherein the information includes at least one of a filter coefficient, a cutoff frequency, and a time constant of the second filter.

17. A control method executed by a second optical device that can be mounted on a first optical device provided with an image blur correction unit comprising:
detecting shaking of the second optical device and outputting a shake signal by a detection unit;
correcting an image blur of an image by a correction unit based on the shake signal;
controlling the correction unit by calculating the signals that have been processed by the first filter with respect to the shake signal by the control unit; and
receiving information related to second filter to be used by an image blur correction unit of the first optical device from the first optical device by a communication unit, and setting a characteristic of the first filter based on the information acquired by the communication unit by a control unit.

* * * * *